Aug. 4, 1936. C. L. SMITH 2,050,133
APPARATUS FOR RAKING MARINE GROWTH FROM CANALS AND THE LIKE
Filed Oct. 22, 1935 3 Sheets-Sheet 1
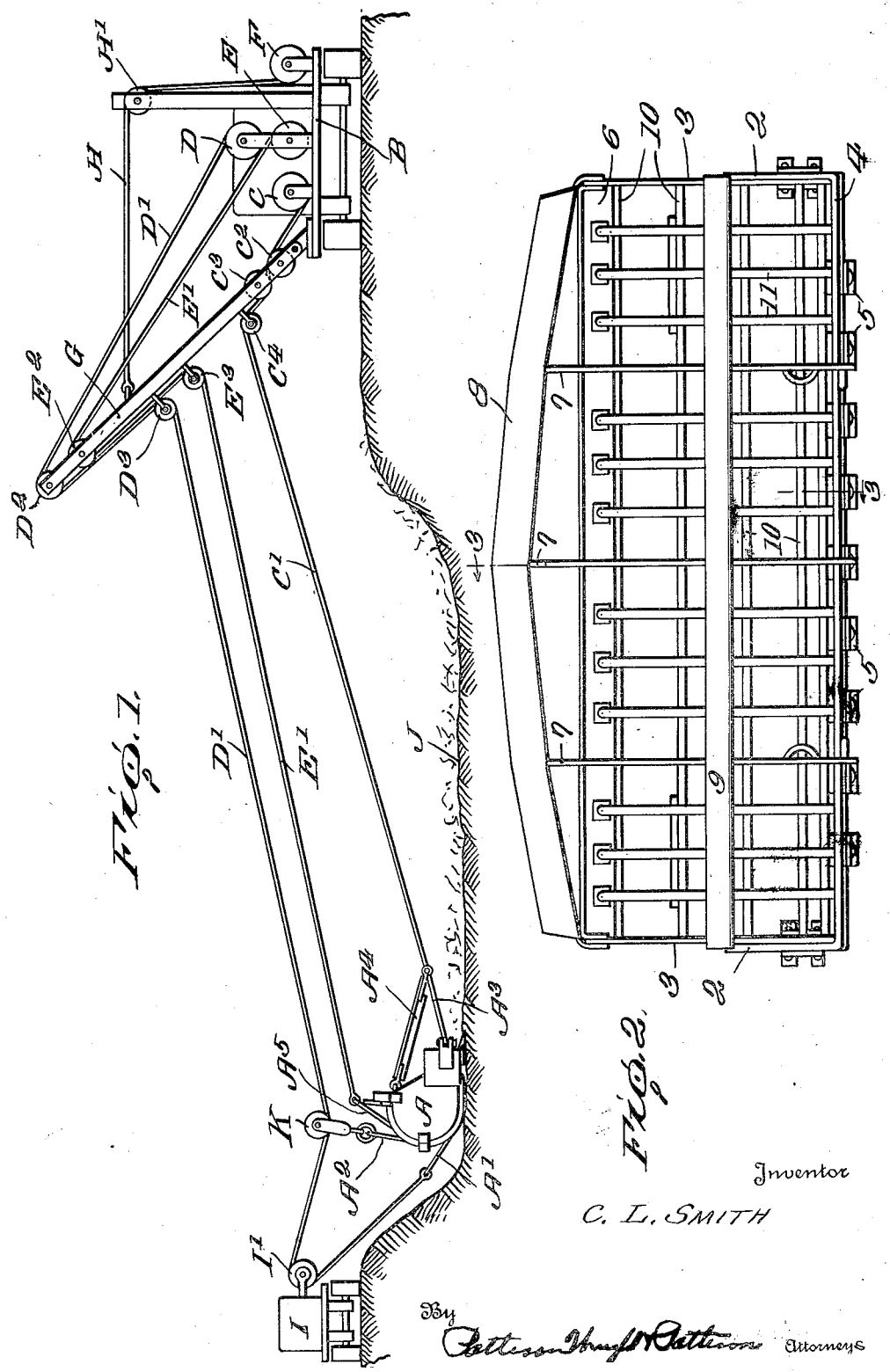
Inventor
C. L. Smith

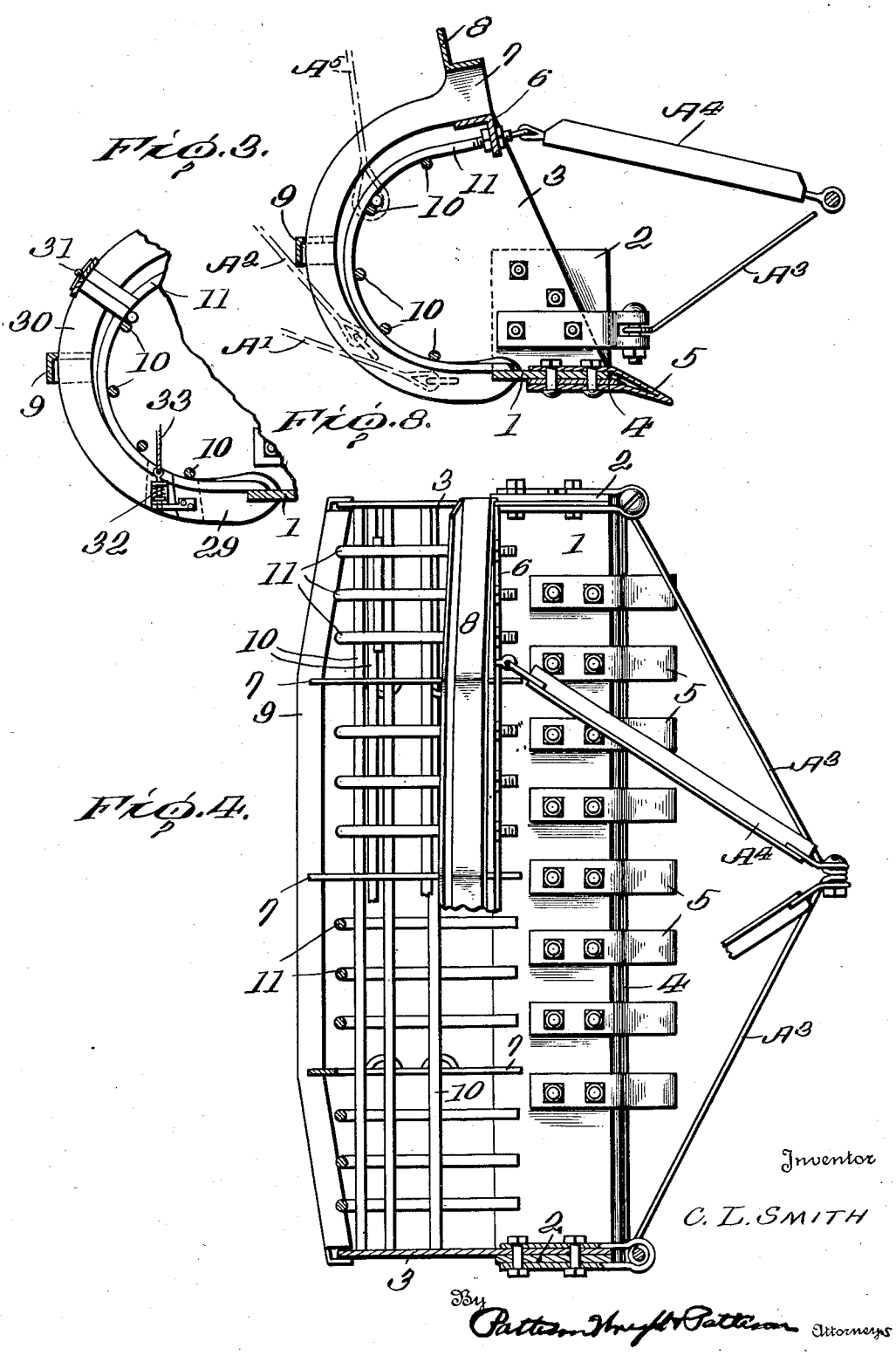

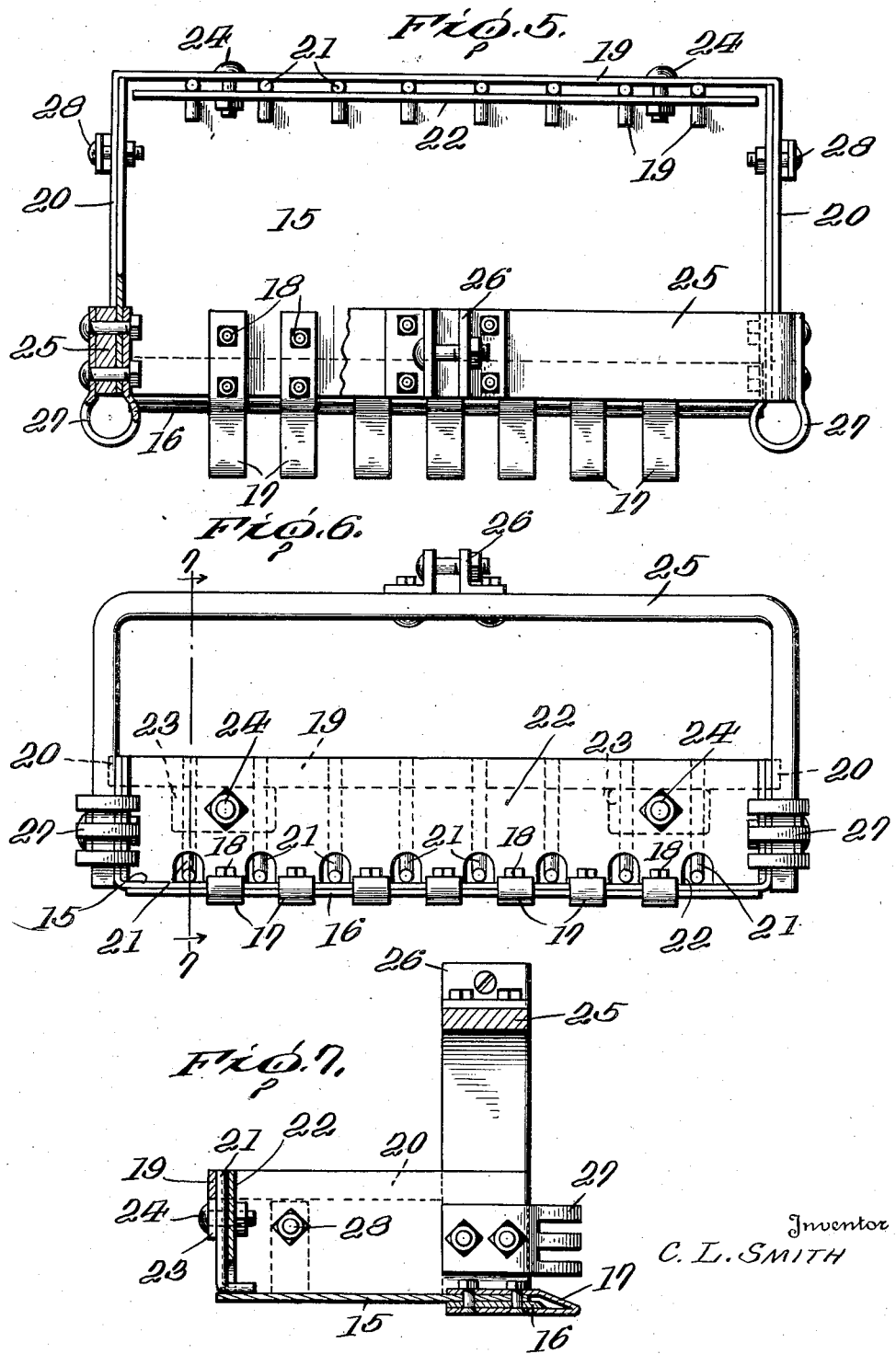

Patented Aug. 4, 1936

2,050,133

UNITED STATES PATENT OFFICE 2,050,133

APPARATUS FOR RAKING MARINE GROWTH FROM CANALS AND THE LIKE

Charlie L. Smith, Vero Beach, Fla.

Application October 22, 1935, Serial No. 46,218

19 Claims. (Cl. 56—8)

This invention relates to an apparatus for raking and cutting hyacinths, grass, weeds and all other growths out of drainage and irrigating canals and ditches, the object being to provide an improved construction of rake and cutter and apparatus for operating the same, whereby all marine growth can be readily removed from the ditches.

Another object of my invention is to provide an improved construction of rake which is exceedingly strong and durable, the same being provided with cutting blades at its forward edge and cutting teeth whereby the vegetable growth can be removed from the ditches or canals without deepening the ditches or canals as the rake is so constructed that the earth, mud, sand and water are allowed to pass through the rake as it drags over the bottom of the canal or ditch.

Another and further object of my invention is to provide a rake with a detachable cutter and detachable teeth whereby the same can be removed and sharpened.

Another object of my invention is to provide a rake with ribs which form runners in order to guide and support the rake in such a position that the vegetable matter will be torn and cut loose from the bottom of the ditch and drawn out without deepening the ditches or canals.

Other and further objects and advantages of the invention will be hereinafter set forth and the novel features thereof defined by the appended claims.

In the drawings,

Figure 1 is a side elevation of an apparatus constructed in accordance with my invention showing the drag line mechanism for operating the rake back and forth in the ditch;

Figure 2 is a front elevation of a rake;

Figure 3 is a vertical section through the rake;

Figure 4 is a top plan view;

Figure 5 is a top plan view of a modified form of rake for cleaning out small drainage or irrigating ditches;

Figure 6 is a front elevation of the same;

Figure 7 is a section taken on line 7—7 of Figure 6, and

Figure 8 is a section of a modified form of rake showing a portion of the same hinged in order to allow the contents to be dumped.

In Figure 1, I have illustrated one method of operating a rake and cutter A constructed in accordance with my invention back and forth over a ditch or canal which comprises a tractor B provided with winding drums C, D and E and F of the ordinary construction.

The tractor B is provided with a pivoted boom G which is raised and lowered by cable H carried by the drum F and passing over a sheave H' disposed on a mast.

The winding drum D carries a cable D' which passes over sheaves $D^2$ and $D^3$ carried by the boom G and over a sheave I' carried by a tractor I adapted to be arranged on the opposite side of the canal J, it, of course, being understood that a deadman could be substituted for the tractor I. The end of the cable D' is connected to a draft cable A' of the rake A whereby the rake can be drawn to the other side of the ditch in order to return it to position to be operated to remove the vegetable growth from the canal or ditch.

The rake carries a hoist cable $A^2$ which is connected to a trolley K which runs on the cable D' as clearly shown in order to allow the rake to be raised and lowered.

Winding drum C carries a cable C' which passes over sheaves $C^2$ and $C^3$ and $C^4$ carried by the boom and is connected to the rake A through the medium of a draft cable $A^3$ and draft bars $A^4$ forming a drag line in order to draw the rake transversely across the canal in order to remove the vegetable growth therefrom.

The drum E carries a cable E' which passes over sheaves $E^2$ and $E^3$ carried by the boom G and is connected to the rake A by cable $A^5$ which provides means for dumping the rake.

This provides a drag line system for a rake which allows the rake to be drawn back and forth across the canal, raised and lowered or adjusted so that the cutting edge and teeth will embed themselves in the bottom and side walls of the canal or ditch any desired depth whereby the vegetable growth can be quickly removed.

The construction of rake as disclosed in Figures 1, 2, 3, and 4 comprises a steel plate 1, the ends of which are bent upwardly as shown at 2 in which are secured side members 3. Secured to the forward edge of the plate 1 by bolts is a cutting blade 4 and embracing this plate and blade are teeth 5 which are bolted on the plate 1 as clearly shown in Figure 3 whereby these teeth can be removed.

The side members 3 are connected together at their upper end by an angle iron 6 to which the upper ends of ribs 7 are welded which are substantially semi-circular in shape and have their lower forward ends bifurcated to receive the plate 1 and are welded thereto as clearly shown, these ribs forming runners upon which the rake travels and is guided as they embed themselves to the earth which prevents the rake from skidding.

An angle truss bar 8 is secured over the top of the forward ends of the ribs 7 and has depending ends which are secured to the side members 3 as clearly shown. The side members are connected together by an angle iron 9 which is provided with slots to receive the ribs 7 and the ribs are welded to this angle iron in order to form a rigid structure, the ends of the angle iron 9 being preferably turned over and welded to the side members.

Arranged within this frame structure is a basket-like structure formed of transverse rods 10 which are welded to the side members and curved rods 11 which are welded at their lower ends to the plate 1 and have their upper ends threaded and secured by nuts to the angle iron 6, the bars 10 and 11 being welded together where they contact with one another and this provides a foraminous basket-like structure to allow mud, earth and sand to pass through and yet will collect the vegetation as it is drawn from the bottom of the ditch.

In the form of rake disclosed in Figures 5, 6, and 7, which is especially adapted to be used for cleaning out small drainage or irrigating ditches, I employ a substantially U-shaped member 15 which forms the bottom and sides of what I term a scoop rake which has connected to its forward edge the cutting blades 16 and teeth 17, these being preferably secured in position by bolts 18. Extending across the rear end of the body thus formed is a bar 19 which is provided with forwardly projecting ends 20 to which the upper ends of bars 21 are welded, the lower ends being turned downwardly and welded to the bottom of the plate 15.

Detachably mounted within the body against the bars 21 is a plate 22 which forms a gate and is bifurcated or serrated to form openings to receive the forward ends of the bars 21 and is secured in position by cleats 23 and bolts 24. This provides means for forming a scoop in which the water is allowed to drain out through the bifurcations of the gate 22 and by removing the gate, the greater portion of the sand and gravel will pass out through the back of the scoop.

An inverted U shaped bar 25 is disposed at the forward end of the scoop thus formed and is provided with suitable clevices 26 and 27 to which the draft cables are adapted to be connected in the usual manner. A clevice 28 is disposed on each side adjacent its rear end to which the dump cables can be connected in order to allow the scoop rake to be dumped.

In the modification shown in Figure 8, the rake 29 is formed of a foraminous structure constructed substantially the same as shown in the preferred embodiment of my invention and is provided with a hinged portion 30 connected to the main body by hinges 31 and locked in closed position by a latch 32 operated by a cable 33 whereby the contents of the structure can be dumped by releasing the latch. This provides means for dumping the contents without turning the rake upside down and by having the back portion and bottom portion hinged as shown, when the rake has been drawn through the canal or ditch and has become full of weeds or other growths, by operating the cable the latch will be released and the contents will fall out by gravity and by manipulating the same, the hinged portion can be swung back into closed position so the spring latch will lock it in closed position and hold it in that position until it is desired to dump the same.

The operation of an apparatus for raking marine growth from canals and the like is as follows: assuming that a motor vehicle is arranged on each side of the canal to be cleaned and that one of the motor vehicles is provided with a plurality of winding drums carrying cables which are connected to the raking implement, that one of these cables passes over the sheave from the winding drum to the other motor vehicle and that the raking implement is on the opposite side of the canal from the winding drums. The operator through the ordinary mechanism or driving means operates the drum C so as to revolve the same which will wind the cable C' thereon so as to draw the raking implement transversely across the ditch or canal. At the same time the operator releases the drum D carrying a return cable D' and by manipulating this drum in connection with the drum C, the raking implement can be raised and lowered so as to throw the cutting blade and teeth into contact with the bottom and walls of the ditch in order to cut and remove the marine growth of hyacinths, grass, weeds and the like. When the raking implement has been drawn upwardly towards the truck carrying the winding drum, the operator manipulates the drum E so as to wind up the cable E' which will dump the rake so as to deposit the marine growth in position where it can be gathered. The operator then manipulates the cables so as to release the draft cable C' and wind up the return cable D' and as the trolley K travels on this cable D' and is connected to the raking implement, when the cable D' is drawn taut through the manipulation of these drums, the raking implement will be raised so that it can be drawn back to its initial position and by manipulating these cables, the operation can be repeated. As the cables pass over sheaves carried by a pivoted boom, the boom can be operated so that the rake can be controlled to a nicety.

When the tractors B and I move along side of the ditch being cleaned, the rake and cutter is elevated, but it is, of course, understood that by moving one tractor and allowing the other tractor to stand still, the rake and cutter could be moved diagonally across the ditch. However, in practice, after the ditch has been cleaned within the range of the movement of the combined rake and cutter, the two tractors are moved along side of the ditch so as to allow another portion of the ditch to be cleaned.

The rake being open mesh or foraminous, allows the dirt, mud and water to readily pass through the same so as to only remove the marine growth from the bottom and walls of the ditch or canal.

While I have shown certain details of construction, I wish it to be clearly understood that my invention consists broadly in utilizing a pair of motor vehicles, one of which is provided with a winding drum and the other with a sheave whereby I am able to manipulate a raking implement so as to raise and lower the same by a cable which also performs the function of returning the rake to its original position, thereby dispensing with the usual extra cable employed for this purpose.

What I claim is:

1. An apparatus for raking and cutting marine growth from canals and the like comprising motor vehicles, one being adapted to travel along each side of said canal, one of said vehicles being provided with a plurality of winding drums carrying cables, a raking and cutting implement connected to the ends of two of said cables for drawing the rake and cutter back and forth transversely across said canal, a sheave carried by the other motor vehicle over which one of said cables passes and a trolley traveling on said last-mentioned cable having a connection with said raking and cutting implement for raising and lowering said raking and cutting implement.

2. An apparatus for raking and cutting marine growth from canals and the like comprising motor vehicles, one being adapted to travel along each side of said canal, one of said vehicles being provided with a plurality of winding drums carrying cables, a raking and cutting implement connected to the ends of two of said cables for drawing the rake and cutter back and forth transversely across said canal, a sheave carried by the other motor vehicle over which one of said cables passes, a trolley traveling on said last-mentioned cable having a connection with said raking and cutting implement for raising and lowering said raking and cutting implement and a winding drum carrying a cable connected to said raking and cutting implement for dumping said raking and cutting implement.

3. In a combined loading and dumping apparatus, a rake and cutter, pull cables having their respective ends connected to said rake and cutter for drawing the rake and cutter forward and backwardly, a trolley carried on the cable for drawing the rake and cutter backwardly and a connection between said trolley and said rake and cutter for raising said rake and cutter when said cable is drawn taut.

4. An apparatus for removing marine growth from canals and the like comprising a rake and cutter, three cables for drawing the rake forwardly and backwardly, elevating the same and dumping the same, the return cable carrying a trolley having a connection to said rake and cutter.

5. An apparatus for removing marine growth from canals and the like comprising a raking and cutting implement and a winding apparatus comprising a plurality of drums carrying cables connected to said implement, one of said cables being adapted to travel over a sheave arranged at a remote position from said winding apparatus and a trolley traveling on said last mentioned cable having a connection with said rake and cutter for raising and lowering the same.

6. A rake and cutter of the kind described comprising a front plate having a cutting edge and cutting teeth connected thereto, end members carried by said plate, a connecting member for said end members, ribs having their upper ends connected to said connecting member and provided with bifurcated lower ends embracing said plate, said ribs forming runners, horizontally disposed bars connecting said end members, and curved bars connecting said plate to said connecting members having connections with the horizontally disposed bars connecting said end members.

7. A rake and cutter for removing marine growth from canals and the like comprising a basket like structure having runners provided with a detachable cutting blade at its forward end and detachable teeth embracing said blade.

8. A rake and cutter of the kind described comprising a plate having upturned ends, end members connected to said upturned ends, an angle iron connecting said end members, curved ribs connected to said angle iron having bifurcated lower ends embracing said plate and secured thereto, a truss rod connecting said end members embracing said ribs, curved rods connecting said plate to said angle iron, horizontal rods connecting said end members and detachable teeth and a cutting blade carried by said plate.

9. A rake and cutter for removing marine growth from canals and the like comprising a frame having runners for supporting the same, said frame carrying a foraminous like structure, said frame having at its forward end a cutting blade and downwardly projecting teeth.

10. A rake and cutter for removing marine growth from canals and the like comprising a frame having runners for supporting the same, said frame carrying a foraminous like structure, said frame having at its forward end a detachable cutting blade and detachable downwardly projecting teeth.

11. A rake and cutter for use in apparatus for removing marine growth from canals and the like comprising a bottom plate having upturned ends, substantially semi-circular end members connected to said upturned ends, said end members being connected together by an angle iron, curved ribs connecting said angle iron to said plate, the forward ends of said curved ribs being bifurcated and embracing said plate, a truss rod arranged over the upper ends of said ribs, a foraminous basket-like structure secured in advance of said ribs between said end members, a detachable cutting blade carried by said plate and downwardly projecting detachable teeth carried by said plate embracing said cutting blade.

12. A rake and cutter comprising a foraminous like structure having a detachable cutting blade at its forward end and detachable downwardly projecting teeth.

13. A rake and cutter of the kind described comprising a frame formed of transverse members and curved ribs and end members, said ribs forming runners for supporting and guiding said rake and cutter and a foraminous basket like structure arranged within said frame.

14. A rake and cutter comprising a substantially U-shaped bottom member having a cutting plate at its forward edge and provided with spaced vertical bars at its rear end and a detachable plate mounted to cover said bars.

15. A rake and cutter of the kind described comprising a substantially U-shaped body portion having a cutting blade at its forward edge, a substantially horizontally disposed U-shaped member having its forward ends embracing the sides of said U-shaped body portion, bars connecting said substantially horizontal U-shaped member to the body and a plate embracing said bars.

16. In a combined raking, cutting and dumping apparatus, a rake and cutter having a cutting edge, pull cables having their respective ends connected to said rake and cutter for drawing said rake and cutter forwardly and backwardly and a trolley traveling on one of said cables having a connection with said rake and cutter for raising said rake and cutter when said cable is drawn taut.

17. In a combined raking, cutting and dumping apparatus, a toothed rake and cutter having a cutting edge, a pair of cables, winding drums for said cables, said cables being connected to said rake and cutter for drawing the rake and cutter forwardly and backwardly, a trolley traveling on the cable for drawing the rake and cutter backwardly and a connection between said trolley and said rake and cutter.

18. In a combined raking, cutting and dumping apparatus, a motor vehicle having a plurality of winding drums carrying cables, an anchor member carrying a sheave, a rake and cutter provided with a cutting edge, one of said cables passing over said sheave and connected to said rake and cutter, the other cable being connected to said rake and cutter and a trolley traveling on the first mentioned cable connected to said rake and cutter.

19. A device of the kind described comprising a sectional foraminous-like structure having a cutting blade at its forward end with downwardly projecting teeth, one section of the back of said structure being pivotally connected to the other section by a hinge to allow one section to move in respect to another to allow the contents of the structure to be dumped and a latch for holding said hinged portion closed.

CHARLIE L. SMITH.